(12) United States Patent
Kennedy et al.

(10) Patent No.: US 8,379,100 B2
(45) Date of Patent: Feb. 19, 2013

(54) MEDICAL CAMERA PLATFORM

(75) Inventors: Bruce Kennedy, Santa Barbara, CA (US); David Selby, Santa Barbara, CA (US); Daniel Wiley, Goleta, CA (US)

(73) Assignee: Arthrex Inc., Naples, FL (US)

( * ) Notice: Subject to any disclaimer, the term of this patent is extended or adjusted under 35 U.S.C. 154(b) by 455 days.

(21) Appl. No.: 11/825,466

(22) Filed: Jul. 6, 2007

(65) Prior Publication Data

US 2009/0009615 A1   Jan. 8, 2009

(51) Int. Cl.
*H04N 5/228* (2006.01)
*H04N 7/18* (2006.01)

(52) U.S. Cl. ..................... 348/222.1; 348/74

(58) Field of Classification Search .......... 348/72, 348/73, 74, 211.2, 211.3, 211.9, 222.1; 600/118
See application file for complete search history.

(56) References Cited

U.S. PATENT DOCUMENTS

| | | | | |
|---|---|---|---|---|
| 6,006,039 | A * | 12/1999 | Steinberg et al. | 396/57 |
| 6,322,497 | B1 * | 11/2001 | Takahashi | 600/118 |
| 6,480,762 | B1 * | 11/2002 | Uchikubo et al. | 600/483 |
| 6,791,601 | B1 * | 9/2004 | Chang et al. | 348/65 |
| 7,358,987 | B2 * | 4/2008 | Takeshige et al. | 348/74 |
| 2004/0028390 | A9 * | 2/2004 | Chatenever et al. | 386/107 |
| 2004/0225185 | A1 * | 11/2004 | Obata et al. | 600/118 |
| 2005/0090730 | A1 * | 4/2005 | Cortinovis et al. | 600/407 |
| 2008/0062261 | A1 * | 3/2008 | Sudo | 348/74 |

FOREIGN PATENT DOCUMENTS

WO   WO 2005122867 A1 * 12/2005

* cited by examiner

*Primary Examiner* — Aung S Moe
(74) *Attorney, Agent, or Firm* — Karish & Bjorgum, PC

(57) ABSTRACT

The invention is a medical platform system that overcomes many of the shortcomings of current systems. The novel platform provides simultaneous image display and capture, network based wireless control, preferably by way of a web browser, and the capacity to acquire surgeon specific setting by way of removable storage devices.

16 Claims, 2 Drawing Sheets

MEDICAL CAMERA PLATFORM

RELATED APPLICATIONS

Not Applicable

FEDERALLY SPONSORED RESEARCH

Not Applicable

SEQUENCE LISTING

Not Applicable

BACKGROUND OF THE INVENTION

This invention relates to medical cameras and in particular to a novel camera platform which provides enhanced usability to the operating room environment.

One of the advances in recent years in surgical procedures is the availability of specialized imaging devices. These devices provide a surgeon with a view of the area of the body being worked on without the necessity of fully opening up the area, thereby allowing for less invasive surgical procedures. Generally, these devices consist of a hand-held video camera and illuminator module. This camera unit interfaces to an optical cable, which can be inserted into the body and provide an optical path without opening up the entire area.

Because of the requirements to be compatible with the operating room environment and the specific needs as to illumination and handling by the surgeon, these imaging devices are highly customized devices. Both the camera units and the electronic interface units are purpose-specific designs. As such, to date, particularly the interface units provide very rudimentary functionality. Set-up, control, image display, and image capture capabilities in existing medical camera platforms are generally inconvenient at best. The usability of these imaging devices could be significantly improved, leading to more efficient use of medical personnel and better surgical results. Thus it is the object of this invention to provide a medical camera platform with improved functionality in the areas of, integrated video over IP, remote access, image display, image capture, camera set-up and camera operation.

BRIEF SUMMARY OF THE INVENTION

The invention is A medical camera system, comprising; A medical camera and a programmable control platform. The control platform includes at least one camera interface, at least one programmable controller, a live surgical video monitor interface, at least one wired or wireless network connection, at least one external mass storage interface, and a program application running on the controller, adapted to accept configuration and operational control from the network and mass storage interfaces.

In some versions, the mass storage interface is USB, In a preferred embodiment, the wired and wireless network interfaces are Ethernet or some other connection to the Internet, and the program application supports a browser interface for live surgical video over Ethernet/Internet, control and configuration.

Also in the preferred embodiment, the platform includes a program application that supports both a live image display and image capture path. Both image display and overlaid platform data may be displayed on an image monitor.

In another version, the platform supports an external keyboard or remote control. These devices may interface to the platform wired, wireless electronically, or through an IR port.

In another version, the Camera and image camera architecture is designed as two separate subsystems that can operate independently to reduce risk of "loss of image" during system start-up, upgrades, or other software issues.

In another embodiment, a bridge is provided between the 2 subsystems to provide data and control during normal operation. This bridge can be "shutdown" and the critical "make a picture" subsystem can operate in a "safe" mode until the image capture subsystem is online.

In one embodiment the surgeon settings are preset in the device for all camera and image capture functions. The surgeon settings are then saved to both internal flash memory and to the surgeon storage USB stick. When the stick is reinserted into the system (or any other system supporting the setting retrieval) the surgeon is recognized and the device is configured per their personal settings.

In another version, the surgeon settings can include camera preferences for image quality, printing, storage location, network settings, video and still image capture settings, head button controls, surgical procedure presets and other parameters.

BRIEF DESCRIPTION OF THE DRAWINGS

The invention will be better understood by referring to the following figures.

DETAILED DESCRIPTION OF THE INVENTION

Figure 1:
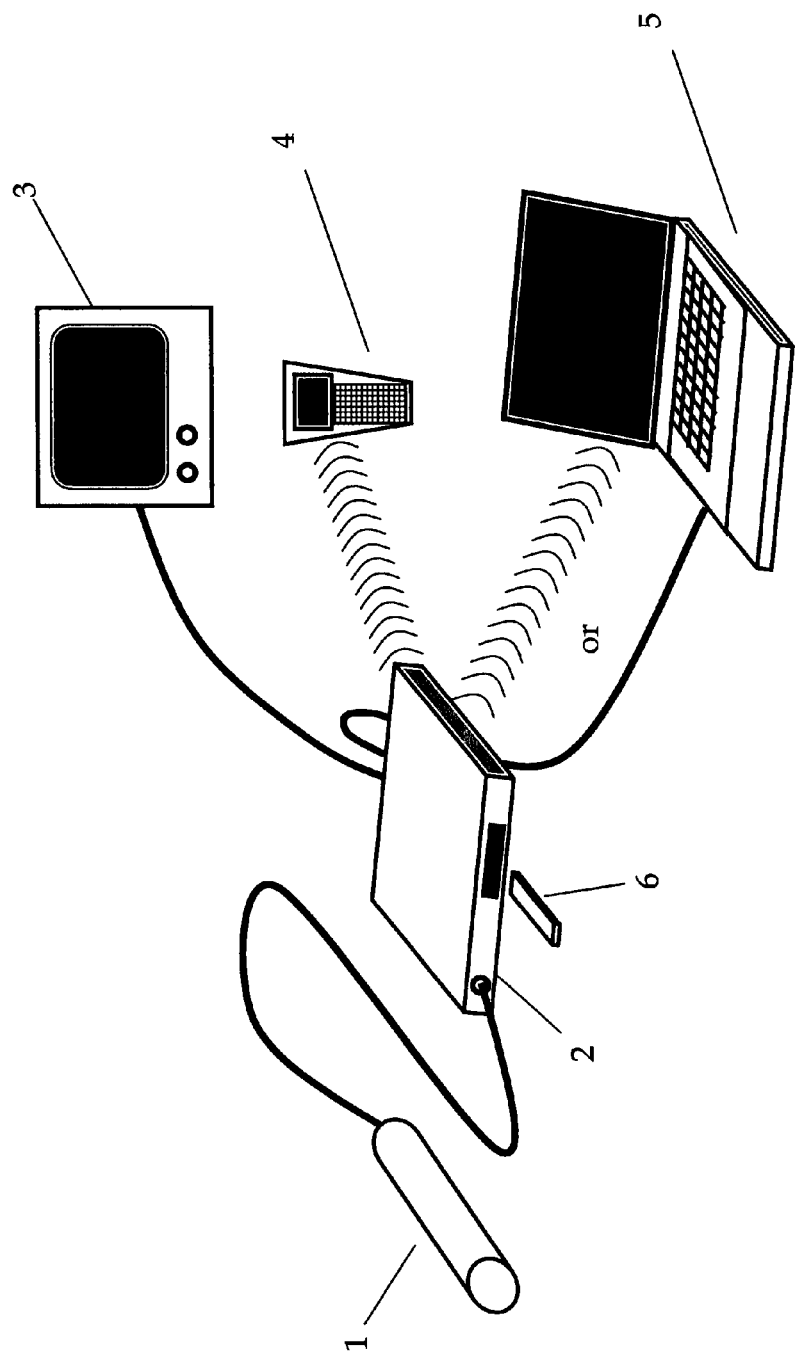
FIG. 1 is a block diagram of the novel system.

Referring to FIG. 1, the preferred embodiments of the invention will be described. Camera 1 (which may include camera head button controls, NTSC/PAL single chip, three chip standard definition, high definition CCDs and CMOS devices) connects to platform controller 2. Controller 2 is preferably a programmable unit containing sufficient processing capacity to accommodate a wide range of control, user interface and image acquisition/processing functions.

The controller runs program applications providing for a variety of capabilities. For instance an image capture and display capability allows for both display if the live feed of the image through a video monitor interface 3, as well as image capture. Also, various other data, such as controller set-up information as well as patient and doctor specific data can be overlaid on the video monitor while the camera feed is displayed.

The controller preferably contains an external mass storage device 6. A USB port is an example of a suitable device. In a preferred embodiment, a program application supports that set-up and other data relevant to a particular patient or surgeon may be recorded on the USB interface to a jump drive type storage unit. Then this removable device may be used to quickly configure the platform for future sessions requiring the same set-up.

The controller also preferably has at least one network interface which may be a wired interface such as Ethernet, but is preferably a wireless network connection which connects the controller to the Internet 5. A program application supports set-up and control of the platform controller using a browser interface. Thus the controller can be accessed anywhere within a local network, or if allowed, from anywhere on the internet, and both programmed and monitored. Thus the program application also supports streaming video of the camera feed, so that the surgical procedure may be conveniently observed in real-time anywhere in the world.

The platform controller also supports local set-up and control devices such as a keyboard or handheld remote control 4. These could connect with a wire interface of a suitable type, or conveniently through an IR port.

The controller preferably contains internal mass storage device. A flash storage memory is an example of a suitable device. In a preferred embodiment, a program application supports that set-up and other data relevant to a particular patient or surgeon may be recorded to the internal flash storage. Then this device may be used to quickly configure the platform for future sessions requiring the same set-up by retrieving the surgeon settings using the preferred user interface such as the IR keyboard or the network interface.

The device embodiment can also include access to previous patient sessions (still and video files) on the internal memory system, USB storage devices or the network if connected. In one embodiment these can be industry standard DICOM type files with "metadata" on the patient and surgical session.

Figure 2:
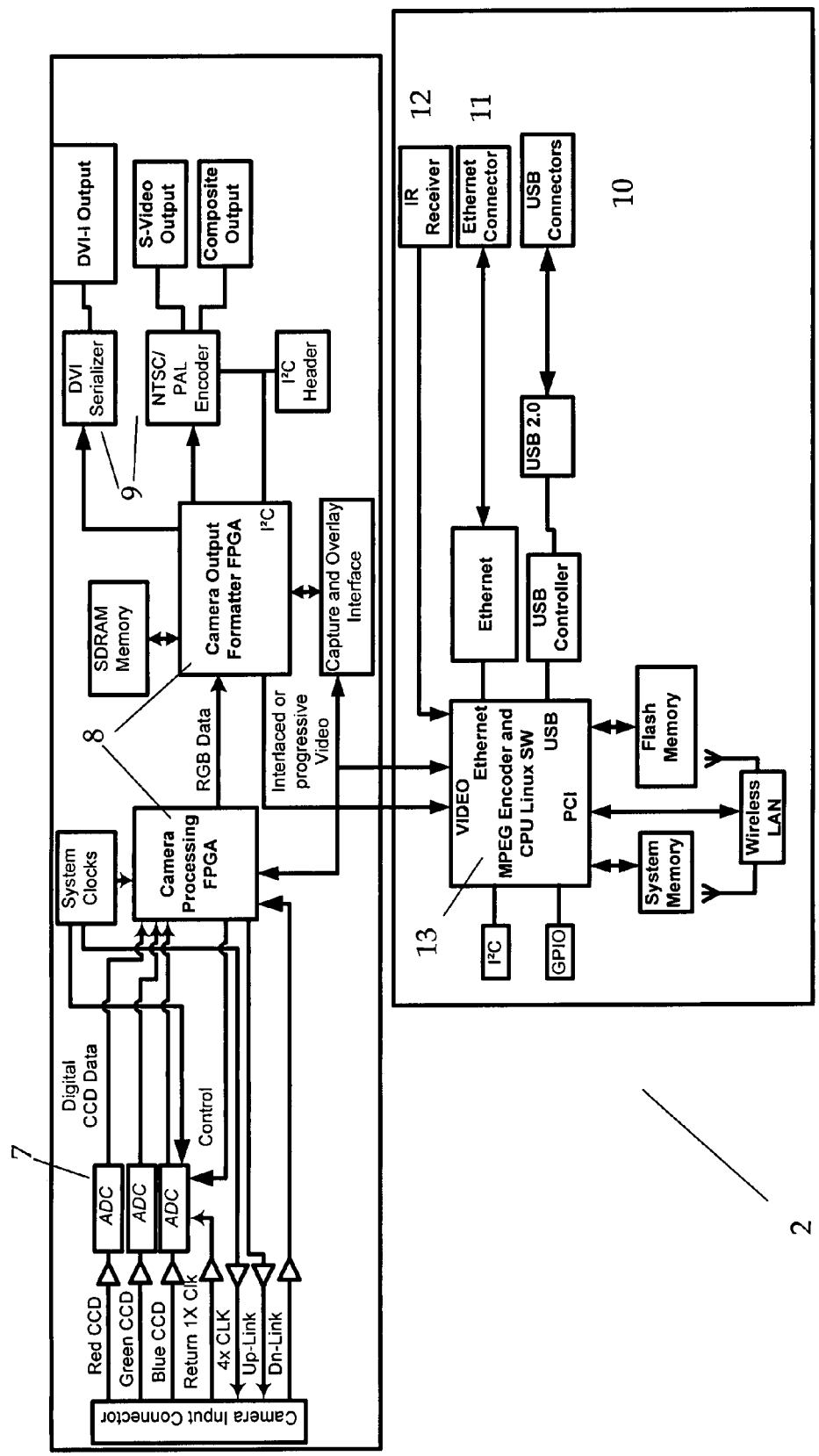
FIG. 2 is a detailed block diagram of an exemplary control platform according to the invention.

An actual existing embodiment of the platform-controller 2 is shown in FIG. 2. The live video is input by progressive RGB CCD inputs CDS and digitize 7r. The LVDS signals are sent to signal processing Field Programmable Gate Arrays (FPGAs) 8 and then to the DVI and NTSC/PAL outputs 9 via output driver devices. Video captures, recordings, overlays atop the outputted live video and user input are accomplished by software on a host system based on MIPS processor 13 running in an embedded controller and hardware video encoding device. The host runs a Linux kernel, API and drivers to support the various functions required in the system. The host will provide the following functionality:

Interface to camera processing system over a dedicated communication and control channel
Support USB Storage devices 10
Support USB Printers and other human interface devices 10
Hard drive controller if required
Ethernet support for browser based setup and live vide streaming 11
PCI interface for wireless Ethernet card and other peripherals
Real time Video encoding (MPEG 1,2/4) for recording and Video over IP (Streaming)
Provide display and overlay data to the FPGAs when required during still capture, video recording and print screen etc. on the main monitor
Set up registers for I²C registers in peripheral devices at start-up or during operation
Support external memory interfaces (EMI/Flash and DDR)
Support UART (RS-232) interfaces for external control and alternatively the IR interface. (Keyboard or remote control) 12
Provide web-server for user interface web pages and software updates over the network or Internet
Provide hardware/software support for three chip products
Store and retrieve surgeon and user settings for future recall on to the system and USB storage devices FPGAs are used to process the live vide and display, overlay and capture functions. System level controls ensure that the live image is protected with "safe modes", watchdogs and other system design elements. This partitioning basically provides separate subsystems for the "make a picture" and "capture" functions in one device with one user interface for setup and control.

Thus a concept and a detailed embodiment have been shown which provide for greatly improved medical camera control and usability.

We claim:

1. A medical camera system, comprising:
 a camera; and,
 a programmable control platform comprising
  at least one camera interface;
  a live surgical video monitor interface;
  at least one wired or wireless network connection;
  at least one external mass storage interface; and
  a live feed video subsystem;
  a host subsystem comprising a programmable controller and an overlay interface, the host subsystem being configured:
   as a server for user interface web pages and software updates over a local network or Internet,
   to capture video;
   to accept configuration and operational control from at least one of the local network or Internet via a browser interface, and mass storage interfaces; and
   to provide data overlaid on the live surgical video monitor interface;
 wherein the live feed video subsystem can be operated independently of the host subsystem to provide a live video to the live surgical video monitor interface.

2. The system of claim 1 wherein the mass storage interface is USB, and the configuration and control information is accepted on the USB interface from a USB compatible storage drive.

3. The system of claim 1 wherein the wired network connection is Ethernet, connected to the Internet.

4. The system of claim 1 wherein the wireless connection connects the system to the Internet.

5. The system of claim 1 further comprising a program application adapted to acquire camera video from the camera interface and support two image paths, a live image path and an image capture path.

6. The system of claim 5 further comprising a program application adapted to;
 provide for preset surgeon settings in the system for all camera and image capture functions; and
 provide for modified personal surgeon settings to be saved to both internal memory and to the external mass storage device, wherein when the external mass storage device is reinserted into the system (or any other system supporting the setting retrieval) the surgeon is recognized and the system is configured per their personal settings.

7. The system of claim 6 wherein the external mass storage device is a USB memory stick.

8. The system of claim 6 wherein the surgeon settings further comprises at least one setting selected from the group consisting of: camera preferences for image quality, printing, storage location, network settings, video and still image capture settings, head button controls, and surgical procedure presets.

9. The system of claim 1 further comprising a program application adapted to acquire camera video from the camera interface and display both video data and overlaid platform data to the video monitor interface.

10. The system of claim 9 wherein the displayed video data is alternatively live video or video data recorded previously.

11. The system of claim 10 wherein video capture and playback may be controlled by remote control.

12. The system of claim 1 further comprising a program application adapted to acquire camera video from the camera interface and stream video data over the network connections.

13. The system of claim 1 further comprising an IR port, wherein the program application is further adapted to accept configuration and control information over the IR port.

14. The system of claim 1 wherein the camera interface is compatible with both a single-chip and a three-chip camera.

15. The system of claim 1 wherein the mass storage interface is at least one of:
internal flash memory,
internal hard drive, or
over a network.

16. The system of claim 1 wherein the data overlaid on the live surgical video monitor interface comprises at least one of the group consisting of: patient specific data and doctor specific data.

* * * * *